United States Patent Office

3,661,933
Patented May 9, 1972

3,661,933
LEVOPIMARIC ACID EPOXYPEROXIDE
Walter H. Schuller, Lake City, Fla., Hideo Kanno, Tokyo, Japan, and Ray V. Lawrence, Lake City, Fla., assignors to the United States of America as represented by the Secretary of Agriculture
No Drawing. Filed Oct. 10, 1969, Ser. No. 865,504
Int. Cl. C07d 11/00
U.S. Cl. 260—340.3                2 Claims

ABSTRACT OF THE DISCLOSURE

Levopimaric acid epoxytransannular peroxide and the methyl ester of this compound were prepared by mixing about 1:1 molar ratio of the levopimaric acid transannular peroxide with an epoxidizing agent (or methyl levopimarate transannular peroxide to produce the methyl ester) such as meta-chloroperbenzoic acid, peracetic acid, permaleic acid, and the like, in organic solvent, refluxing the mixture until epoxidation is complete, washing the product with aqueous base to remove unreacted impurities, and finally recrystallizing the product from a suitable organic solvent.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of a new composition of matter, namely levopimaric acid epoxytransannular peroxide (I), whose structure is as follows:

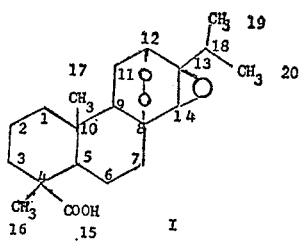

In addition, this invention relates to the process for the prepaartion of this new compound. Furthermore, this invention relates to the use of this material as an initiator for the polymerization of vinyl monomers and styrenated-unsaturated polyesters.

The preparation of levopimaric acid transannular peroxide (II)

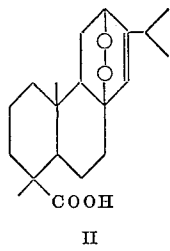

is described in U.S. Pat. No. 3,268,621 (Aug. 23, 1966) by R. N. Moore, R. V. Lawrence, and W. H. Schuller. This material is useful as a free radical initiator. However, a large portion of the peroxide does not break down into free radicals on heating but is converted into a dioxide (III), which does not break down into useful free radicals at the temperatures employed [see U.S. Pat. No. 3,370,019 (February 20, 1968) by W. H. Schuller and R. V. Lawrence].

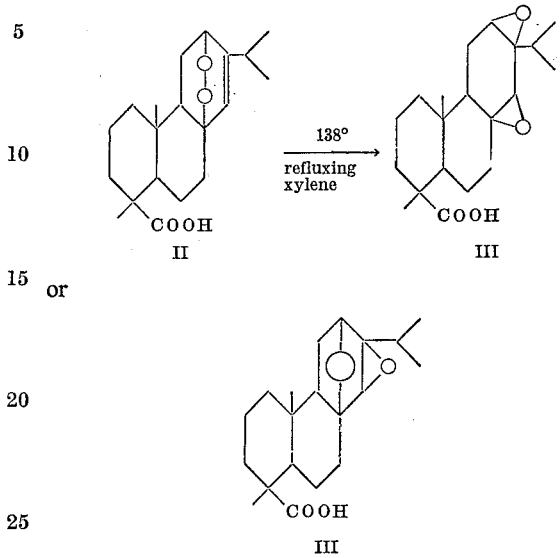

Thus, the transannular peroxide (II), was epoxidized and the epoxy-compound found to be readily decomposed on heating to give free radicals, which are useful in the polymerization of vinyl monomers and styrenated-unsaturated polyester resins.

In our procedure, meta-chloroperbenzoic acid was used as the epoxidizing agent. The theoretical amount of active meta-chloroperbenzoic acid can be used or up to a 15% excess can be employed to insure the completeness of the reaction. Other commonly used epoxidizing agents could also be used such as peracetic acid, perbenzoic acid, permaleic acid, etc. The solvent we employed was ethylene chloride. Other solvents could also be used such as benzene, methylene chloride, chloroform, 1,2-dichloroethane, diethyl ether, or ethyl acetate. The reaction in ethylene chloride was carried out at reflux temperature (B.P. 83.7° C.) until the epoxidation was complete, as indicated by the leveling off of a plot of optical rotation vs. time. This same technique could be followed in any other solvent. In the case of ethylene chloride, the reaction required about 2 hours under reflux conditions. The reaction time in other solvents would be correspondingly longer or shorter depending upon the reflux temperature of the solvent employed. Where the solvent used boils above 85° C., refluxing is not recommended; it is suggested the reaction be run at about 85° C. instead.

The reaction mixture is washed free of meta-chlorobenzoic acid (and of any unreacted meta-chloroperbenzoic acid) by washing three times with 2% aqueous sodium bicarbonate solution in an amount so that the total sodium bicarbonate used is equivalent to the theoretical amount required to neutralize all the meta-chloroperbenzoic acid charged. This separation takes advantage of the greater acidity of the chlorobenzoic acids as compared to the resin acid derivative. If desired, an excess of sodium bicarbonate can be used up to about 30% of the theoretical (based on meta-chlorobenzoic acid formed) or until the product is chlorine free.

The product is recrystallized from ethylene chloride to give levopimaric acid epoxytransannular peroxide (I) in the pure state.

EXAMPLE 1

A quantity of 20 g. (0.06 mole) of levopimaric acid transannular peroxide was dissolved in 340 ml. of ethylene chloride. To this solution was added 13.5 g. of 83.5% active (0.06 mole) meta-chloroperbenzoic acid dissolved in 80 ml. of ethylene chloride, during stirring. The solution was refluxed for two hours (B.P. 83.7 of ethylene chloride), at which point a plot of optical rotation of the solution vs. time has leveled off, indicating the reaction to be over. The solution was washed three time with 120 ml. of 2% sodium bicarbonate (total moles 0.074) and then with water until neutral. The solution was dried over sodium sulfate, the solvent stripped off on a flash evaporator under vacuum. The yield was 10.2 g.; (50.0%); $[\alpha]_D^{25}+90.5°$ (c., 1.9 in 95% EtOH). One further recrystallization from ethylene chloride gave 6.0 g. (yield 30%) of analytically pure levopimaric acid epoxytransannular peroxide (I); $[\alpha]_D^{25}+128.5°$ (c.=0.91 in 95% EtOH); M.P. 168° C. with dec.; no absorption in the ultraviolet region; peroxide content 1.2 moles of peroxide/mole of resin acid derivative:

*Analysis.*—Calc'd for $C_{20}H_{30}O_5$ (percent): C, 68.54; H, 8.63; O, 22.83. Found (percent): C, 68.70; H, 8.58; O, 23.01.

The compound exhibited the following signals in the N.M.R. spectrum run in deuterochloroform: $\delta$ 0.84 (d, 3, $J=7H_2$, isopropyl $CH_3$), 0.87 (s, 3, $C_{10}$—$CH_3$), 1.14 (d, 3, $J=7H_2$, isopropyl $CH_3$), 1.20 (s, 3, $C_4$—$CH_3$), 3.36 (s, 1, $R_2C_{14}(OR)$—$H$), 4.40 (m, 1, RC(OOR)—$H$).

EXAMPLE 2

To a solution of 05.9 g. (0.017 mole) of the transannular peroxide of methyl levopimarate in 150 ml. of ethylene chloride was added 4.21 g. (15% excess of 80% active material) of meta-chloroperbenzoic acid. The solution was refluxed 7 hours. The solution was washed three times with 500 ml. each of 2% sodium carbonate, water washed until neutral, and the solvent blown off under a stream of nitrogen. The residue was crystallized from methanol; weight 1.1 g., M.P. 186–188° C. with dec., $[\alpha]_D^{25}+123.8°$ (c.=1.11 in 95% EtOH); no change in properties on recrystallization from methanol.

*Analysis.*—Calc'd for $C_{21}H_{32}O_5$ (percent): C, 69.20; H, 8.85; O, 21.95. Found (percent): C, 69.22; H, 8.75; O, 21.87.

EXAMPLE 3

Test tubes are filled with 15 ml. each of the following vinyl monomers: styrene, methacrylic acid, acrylic acid, and methyl methacrylate and the tubes were stoppered. Another series of tubes containing 15 ml. each of the same monomers plus 3% by weight of levopimaric acid epoxide transannular peroxide (I) was added to each tube and dissolved by stirring. All tubes were stoppered and placed in an oven at 95° C. together with the blank runs.

(a) After 40 minutes, the acrylic acid plus catalyst became a hard plastic (polymer) while the acrylic acid blank was still fluid.

(b) After 40 minutes, the methyl methacrylate plus catalyst had polymerized to a white solid while the blank was still fluid. After 5 hours more at 95° C. all remaining samples were still fluid. The temperature of the oven was raised to 130° C.

(c) After 40 minutes, the styrene plus catalyst became extremely viscous while the blank was only slightly viscous.

(d) After 40 minutes, the methyl methacrylate plus catalyst became a stiff polymeric solid while the blank was still fluid.

EXAMPLE 4

To 5 g. of styrenated unsaturated polyester in a small beaker was added 0.25 g. (5%) of levopimaric acid epoxy transannular peroxide (I) and the solid well mixed into the liquid mass. A blank comprising 5 g. of the styrenated unsaturated polyester in a separate beaker was prepared. Both beakers were placed in an oven at 130° C. After 50 minutes, the blank was still fluid while the sample containing catalyst was a hard polymer.

EXAMPLE 5

Example 4 was repeated in which case levopimaric acid epoxytransannular peroxide (I) was replaced by the methyl ester of levopimaric acid epoxy transannular peroxide. Essentially the same results were obtained.

To summarize, the instant invention consists of two new compositions of matter, and processes for preparing these. The instant invention discloses a process for preparing levopimaric acid epoxytransannular peroxide, a new composition of matter, comprising mixing about 1:1 molar ratio of levopimaric acid transannular peroxide with an epoxidizing agent in organic solvent, refluxing the mixture until epoxidation is complete, washing the product with aqueous base to remove unreacted reagents and other impurities, and recrystallizing the product from a suitable organic solvent.

The instant invention also discloses a process for preparing the methyl ester of levopimaric acid epoxytransannular peroxide, a new composition of matter, comprising mixing about 1:1 molar ratio of methyl levopimarate transannular peroxide with meta-chloroperbenzoic acid in ethylene chloride, refluxing the mixture until epoxidation is complete, washing the product with base until neutral, removing hte solvent, and crystallizing the product from a suitable solvent.

We claim:
1. Levopimaric acid epoxytransannular peroxide.
2. The methyl ester of levopimaric acid epoxytransannular peroxide.

References Cited

UNITED STATES PATENTS 3,143,578   8/1964   O'Connor et al. ____ 260—348 X
3,230,235   1/1966   Moore et al. _____ 260—340.3

ALEX MAZEL, Primary Examiner

J. H. TURNIPSEED, Assistant Examiner

U.S. Cl. X.R.

260—89.3, 93.5, 346.2, 348